United States Patent
Constantine

[15] 3,671,744
[45] June 20, 1972

[54] DIGITAL DIFFERENTIAL EMISSION X-RAY GAUGE

[72] Inventor: Nikiforos Constantine, Brighton, Minn.

[73] Assignee: Minnesota Mining and Manufacturing Company, Saint Paul, Minn.

[22] Filed: Oct. 5, 1970

[21] Appl. No.: 77,833

[52] U.S. Cl. .................................. 250/51.5, 250/83.3 D
[51] Int. Cl. ................................................. G01n 23/22
[58] Field of Search ............................ 250/51.5, 49.5 PE

[56] References Cited

UNITED STATES PATENTS

| | | | |
|---|---|---|---|
| 3,525,863 | 8/1970 | Constantine et al. | 250/51.5 |
| 3,351,755 | 11/1967 | Hasler | 250/49.5 PE |

Primary Examiner—James W. Lawrence
Assistant Examiner—C. E. Church
Attorney—Kinney, Alexander, Sell, Steldt & Delahunt

[57] ABSTRACT

Apparatus and method to indicate the concentration of a selected element within a target wherein separated polychromatic X-rays produce first and second monochromatic X-ray beams, the wavelength of the first beam being slightly less than the absorption edge of the selected element and the wavelength of the second beam being slightly greater than the absorption edge of the selected element. The first and second beams irradiate the target to produce fluorescent characteristic radiation of the target elements which is received by a first and second detecting means for producing a first and second digital signal, respectively. A monitoring means produces a third digital signal indicative of intensity fluctuations of the polychromatic x-rays. A differential ratio computer means produces an output signal which is the difference between the first and second digital signals divided by the third digital signal, which output signal indicates the concentration of the selected element within the target. First, second and third movable wedges are utilized in calibrating the device and to provide an indication of the concentration of the selected element in percent deviation from a standard or in engineering units (mg/dm²).

13 Claims, 7 Drawing Figures

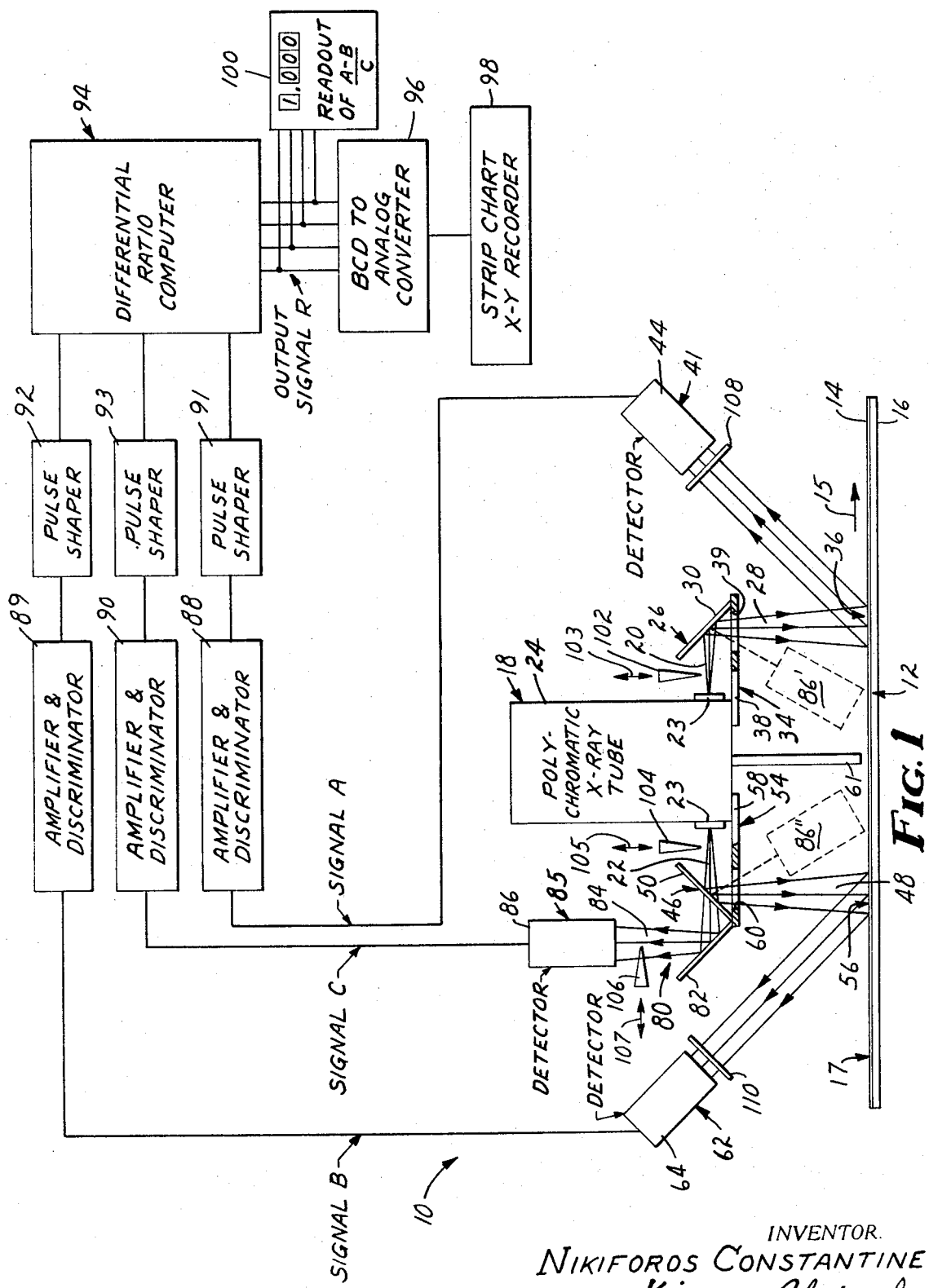

INVENTOR.
NIKIFOROS CONSTANTINE
BY Kinney, Alexander,
Sell, Steldt & DeLaHunt
ATTORNEYS

DIGITAL DIFFERENTIAL EMISSION X-RAY GAUGE

BACKGROUND OF THE INVENTION

In many testing applications, it is necessary to accurately determine the concentration of a particular element within a coating or a matrix. For example, it is desirable to ascertain the quantity of silver within an emulsion of photographic film during the manufacture thereof.

One attempt for measuring the quantity of emulsion silver in the manufacture of photographic film has been the utilization of two measuring units, each measuring unit consisting of a low-energy radioactive source producing X-rays to irradiate the film and a radiation detector to measure the characteristic radiation received from the film. Each measuring unit also includes a filter to selectively transmit radiation from the film. The filter of one unit is effectively transparent to the X-radiation of silver, among other elements, and the filter of the other unit is effectively opaque to X-radiation of silver but transparent to the X-radiation of said other elements. The electrical outputs of each detector are passed into a subtraction circuit to yield an output proportional to the silver content of the film. Such a system entails relatively long measuring periods and slow film web speed to achieve an acceptably accurate indication of silver within the emulsion. In this general connection, attention is directed to Great Britain Pat. No. 1,016,906.

Another differential emission X-ray gauging apparatus is that of U. S. Pat. No. 3,525,863, of the present inventor and Robert C. Hill, which utilizes two sequentially emitted monochromatic X-ray beams for determining the amount of a selected element (e.g., silver) within a thin coating on a moving web (e.g., photographic film). One of the two sequential monochromatic X-ray beams excites the selected element and other elements of lower atomic number within a coating and web to emit fluorescent characteristic radiation. The other sequential monochromatic X-ray beam excites the other elements (within the coating and web) having lower atomic numbers than the selected element, but not the selected element, to emit fluorescent characteristic radiation. A single detector adjacent the web receives the differential radiation and produces modulated output signals representing the concentration of the selected element within the coating. The differential emission apparatus of U.S. Pat. No. 3,525,863 is, in general, a relatively sophisticated system which is susceptible of indicating an erroneous concentration of the selected element. For instance, the specialized X-ray tube including focusing and deflecting apparatus and electronics that has to be specially built for this system, produces an X-ray beam having an intensity susceptible to anode current and/or cathode-anode voltage changes in the electron gun and to changes in focusing and deflecting electronics. Consequently, high stability of the X-ray generator and of the focusing, deflecting, and processing electronics is required in order to avoid an appreciable error in the measurement.

Another X-ray fluorescent gauge utilized to measure the amount of silver within photographic film is that of U.S. Pat. application, Ser. No. 649,911, now U.S. Pat. No. 3,562,525 of the present inventor and Larry L. Hobbs, wherein a single X-ray source is divided into two beams to excite silver within the web to emit fluorescent characteristic radiation and to simultaneously irradiate a reference sample containing a known amount of silver for comparative measurements between the known and unknown amounts of silver.

THE PRESENT INVENTION

The device of the present invention provides an exceptionally accurate indication of the concentration of a selected element within a target, which indication can be obtained at relatively high counting rates within short time constants to provide accurate measurements on high speed webs. The present device also provides a continuous calibration basis to prevent undetected drifting and erroneous indication of the concentration of the selected element wherein the difference of the first and second digital signals can be compared to the internal standard of the monitor to varify that the system is in calibration.

In a typical photographic film production installation, the film web will be moving past the device at 120 feet/minute and for a 10 second sampling period the first and second monochromatic beams will irradiate localized areas, 2 inches apart, aligned in the direction of movement of the web. As such, the first and second detectors will sample from sample areas 240 inches long with a common overlapped sample area of 238 inches long with 4 inches not being common to the first and second detectors. Thus, as utilized, the present device will provide sampling from substantially identical areas of the web, as the web moves past the present device, to provide even greater indicated accuracy of the concentration of silver within the photographic film.

The apparatus of the present invention comprises polychromatic means including an electron gun for generating polychromatic X-rays, and including divider means for dividing the polychromatic X-rays into first and second polychromatic X-ray beams. A first monochromatic means receives the first polychromatic beam and generates a first monochromatic X-ray beam, having a wavelength slightly less than the absorption edge of the selected element, and directs the first monochromatic X-ray beam toward a target. A first detecting means receives the fluorescent characteristic radiation emitted from the selected element, and from the other elements within the target, and produces a first digital signal corresponding to the received radiation. A second monochromatic means receives the second polychromatic beam and generates a second monochromatic X-ray beam, having a wavelength which is slightly greater than the absorption edge of said selected element, and directs the second monochromatic X-ray beam toward the target. A second detecting means receives fluorescent characteristic radiation emitted from the other elements (but not from the selected element) and produces a second digital signal corresponding to the received radiation. The device also includes a monitoring means to receive radiation caused by the polychromatic X-rays for producing a third digital signal indicative of intensity fluctuations within the polychromatic X-rays. A differential ratio computer means receives and integrates the first, second and third digital signals to produce an output signal which is the difference between the first and second digital signals divided by the third digital signal to indicate the concentration of the selected element independent of changes in the intensity of the polychromatic X-rays, independent of variations in other elements in the target, and independent of aberrations in the detectors and signal processing electronics.

The method of the present invention includes the steps of generating polychromatic X-rays and dividing the polychromatic X-rays into first and second polychromatic X-ray beams; generating a first monochromatic X-ray beam directed to irradiate a target; sensing fluorescent characteristics radiation emitted from the selected element and from other elements within the target and producing a first digital signal; generating a second monochromatic X-ray beam directed to irradiate the target; sensing fluorescent characteristic radiation emitted from the other elements within the target and producing a second digital signal. The method further includes the steps of monitoring radiation caused by the polychromatic X-rays and producing a third digital signal indicative of the intensity fluctuations of the polychromatic X-rays; and combining the first, second, and third digital signals to produce an output signal which is the difference between the first and second digital signals divided by the third digital signal to indicate the concentration of the selected element independent of changes in the intensity of the polychromatic X-rays, independent of variations in the amount of other elements in the target, independent of aberrations in the detectors and signal processing electronics.

The term fluorescent characteristic radiation as used in this application is meant to include the secondary characteristic radiation emitted from each element at discrete wavelengths, such as for example, the $K_{\alpha_1}$, $K_{\alpha_2}$, $K_{\beta_1}$, and $K_{\beta_2}$ characteristic lines. In practicing this invention, it may be desired to select a predetermined one of the characteristic lines or to average radiation from certain of the lines. Also, it may be desired to use lower order lines of radiation, such as for example, the L lines. In any event, the term fluorescent characteristic radiation is contemplated to cover such uses of the characteristic emission lines.

For purpose of example, the following table sets forth typical elements which could be gauged by using the apparatus and method of the present invention. The wavelength of one of the selected monochromatic X-ray beams is selected to excite at least the $K_{\alpha_1}$ characteristic lines of the selected element and the wavelength of the other monochromatic X-ray beam is selected to avoid excitation of the selected element. As is known in the art, a monochromatic X-ray beam generated at the same wavelength as the selected element $K_{\alpha_1}$ wavelength will not excite the same to fluorescence.

This invention will become better understood by reference to the following detailed description when considered in connection with the accompanying drawings in which like numerals designate like parts throughout the figures and wherein:

FIG. 1 is a diagrammatic representation of one embodiment of the present invention illustrating a digital differential emission X-ray gauging device which is capable of practicing the method of this invention;

FIG. 2A is a graph illustrating X-ray intensity plotted as a function of energy depicting the characteristics of one monochromatic X-ray beam having a characteristic wavelength which is slightly shorter than the absorption edge wavelength of a selected element and another monochromatic X-ray beam having a characteristic wavelength which is slightly longer than the absorption edge wavelength of a selected element;

FIG. 2B is a graph illustrating a radiation spectrum reaching

| Selected element to be gauged | Atomic number | Absorption edge (A.) | $K_{\alpha 1}$ (A.) | 2nd secondary emitter | | 1st secondary emitter | |
|---|---|---|---|---|---|---|---|
| | | | | Element | $K_{\alpha 1}$ | Element | $K_{\alpha 1}$ |
| Chromium (Cr) | 24 | 2.0701 | 2.290 | Iron (Fe) | 1.936 | Chromium (Cr) | 2.290 |
| Iron (Fe) | 26 | 1.7433 | 1.936 | Nickel (Ni) | 1.658 | Iron (Fe) | 1.936 |
| Zinc (Zn) | 30 | 1.2833 | 1.435 | Germanium (Ge) | 1.254 | Zinc (Zn) | 1.435 |
| Bromine (Br) | 35 | .920 | 1.040 | Strontium (Sr) | .875 | Bromine (Br) | 1.040 |
| Silver (Ag) | 47 | .4858 | .559 | Antimony (Sb) | .470 | Silver (Ag) | .559 |
| Tin (Sn) | 50 | .4247 | .491 | Barium (Ba) | .385 | Tin (Sn) | .491 |

The element of the first secondary emitter has to be an atomic number greater than the atomic number of the sought element, to excite the sought element to fluorescence, and the element of the second secondary emitter has to be an atomic number equal to or less than the atomic number of the sought element to avoid excitation of the sought element to fluorescence. For example, for the sought element of Silver, antimony (atomic number 51) and silver (atomic number 47) would generally be used for the first and second secondary emitters, respectively; however, molybdenum (atomic number 42) could be used for the second secondary emitter. If the element to be employed for the secondary emitter is not available in a foil or solid form, its oxide may be dispersed in an organic or other low atomic number matrix. The elements employed for the first and second secondary emitters should be close in atomic number to provide ease of balance between fluorescence of the lower atomic number elements excited by the first and second secondary emitters.

An analog detecting apparatus, as utilized in above identified U.S. Pat. No. 3,525,863, provides an output signal that can be drastically affected by changes in the gain of the processing electronics. These potential aberrations are overcome in the present device by using detectors of a digital nature. A digital detector, as used in this application, is a detector that will produce an electrical pulse for each X-ray quantum absorbed by the detector. The pulse, after amplification and shaping, is fed into a counter where individual pulses representative of X-ray quantum are counted. The detectors are operated at what is known as a plateau region which means that appreciable changes in the overall gain of the signal processing electronics will not introduce an appreciable error in the measurement of the X-ray quanta impinging on the detectors.

the first detector depicting the fluorescent characteristic radiation emitted by the selected element, fluorescent characteristic radiation emitted from other lower atomic number elements and backscattered radiation in response to the target being irradiated by the first monochromatic X-ray beam;

Figure 2A:
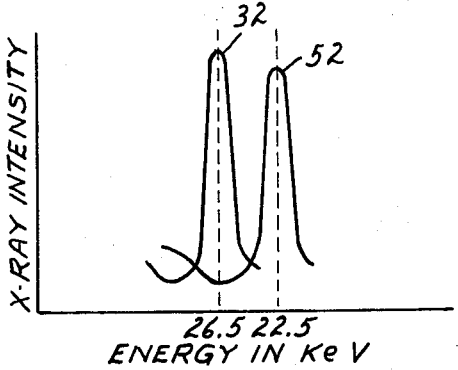
FIG. 2C is a graph illustrating a radiation spectrum reaching the second detector depicting fluorescent characteristic radiation emitted from other lower atomic number elements (exclusive radiation from the selected element) and backscattered radiation produced in response to the target being irradiated by the second monochromatic X-ray beam.

The first embodiment illustrated in FIG. 1, generally designated as device 10, is adapted to continuously indicate and/or record the concentration of a predetermined selected element, such as one selected from the above table, within a target 12. The target 12 may be a stationary specimen with the selected element mixed throughout or of a web 17 comprising a base 16 and a coating 14 containing the selected element. In a typical production application of the device 10, the web 17 would be that of photographic film wherein coating 14 would be the emulsion layer containing the selected element of silver and the base 16 would be a polyester backing. For purposes of illustration and to simplify understanding of the device and method of this invention, the selected element will generally be hereinafter exemplified as silver (Ag).

The device 10 comprises a polychromatic means 18 including an electron gun having a cathode (not shown), anode (not shown) and tungsten surface (not shown) to be bombarded by an electron beam for generating polychromatic X-rays that are subsequently divided into first and second polychromatic X-ray beams 20,22, respectively, by the two X-ray transmitting windows 23,23. A first monochromatic means 26 including a first secondary emitter 30 receives the first polychromatic X-ray beam 20 and generates a first monochromatic X-ray beam 28 having a wavelength which is slightly less than the absorption edge of the selected element (e.g., Ag) and directs the beam 28 toward the target 12. The X-rays of beam 28 excite the selected element and other elements of lower atomic number than the selected element to produce characteristic lines from the excited elements. Thus, for example, when it is desired to detect the concentration of silver, antimony can be used as the first secondary emitter 30 and the beam 28 will have an energy wave form 32 with a peak energy value of 26.5 keV as shown in FIG. 2A. A first collimating means 34 including a first plate 38, directs the first beam 28 through a first aperture 39 to irradiate a first localized area 36.

A first detecting means 41 includes a first digital detector 44, positioned adjacent to the first localized area and on the same side of the target as means 26, to receive and sense the fluorescent characteristic radiation emitted from the selected element and from the other elements for producing a first digital signal A corresponding to the radiation received from the area 36. The digital detector 44 can be a proportional counter or a scintillation counter, for example, a Harshaw sodium iodine scintillation crystal with an XP–1010 Amprex photomultiplier tube, wherein for each X-ray quantum reaching the detector 44 a single electrical pulse is produced. Thus, if for example 100 X-rays reached the detector 44 within a given time period the first digital signal A would comprise 100 electrical pulses within that given time period.

The device 10 also includes a second monochromatic means 46 having a second secondary emitter 50 for receiving the second beam 22 to produce a second monochromatic X-ray beam 48 having a wavelength which is slightly greater than the absorption edge of the selected element and directs the beam 48 toward the target 12. The X-rays of beam 48 excite the other elements to emit characteristic lines but do not excite the selected element. Thus, for a selected element of silver, silver could be used as the second secondary emitter 50 and the beam 48 will have an energy wave form 52 with a peak energy value of 22.5 keV as shown in FIG. 2A. A second collimating means 54 including a second plate 58, directs the second monochromatic beam 48 through a second aperture 60 to irradiate a second localized area 56. A second detecting means 62 includes a second digital detector 64, positioned adjacent to the second localized area 56 and on the same side of the target 12 as means 46, to receive and sense the fluorescent characteristic radiation emitted from the other elements for producing a second digital signal B corresponding to the radiation received from area 56. The second digital detector 64 can be a proportional counter, a scintillation counter, (or identical to the digital detector 44) wherein for each X-ray quantum reaching the detector 64 a single electrical pulse is produced. As above explained in reference to the production of the first digital signal A, the second digital detector 64 will similarly produce a second digital signal B corresponding to the number of X-rays received by the detector 64 within a given time.

A shield 61 disposed between the localized areas 36, 56 serves to separate and isolate the radiation from the opposite detectors 44, 64. Thus, the fluorescent radiation caused by the first monochromatic means 26 and backscattered radiation from the emitter 30 is excluded from reaching the second detecting means 62 and similarly, the fluorescent radiation caused by the second monochromatic means 46 and backscattered radiation from the emitter 50 is excluded from reaching the first detecting means 41.

FIG. 2A is a graph representing X-ray intensity plotted as a function of energy in keV for both of the monochromatic X-ray beams 28, 48 produced by the polychromatic means 18 of FIG. 1. Wave form 32 of FIG. 2A illustrates the intensity and energy of the first monochromatic X-ray beam 28 produced by the antimony secondary emitter 30. Wave form 52 represents the intensity and energy of the second monochromatic X-ray beam 48 generated in response to the silver secondary emitter 50. The first monochromatic X-ray beam 28 peaks at about 26.5 keV and has sufficient energy to excite the selected element (Ag). In this example, the selected element silver, has a characteristic fluorescent radiation wavelength at approximately 22.5 keV or 0.55 A. The other elements within the target 12, having lower atomic numbers than the selected element, are similarly excited to emit their characteristic lines of radiation.

Figure 2B:
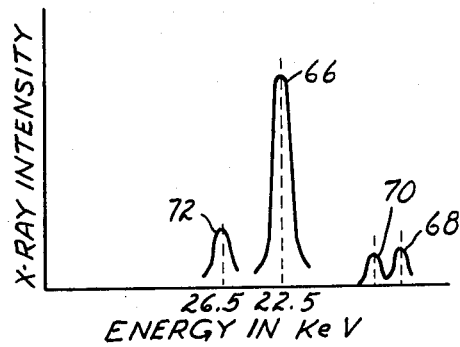

FIG. 2B is a plot of the X-ray intensity plotted as a function of energy in keV of the radiation received by the first digital detector 44, from area 36, in response to the first monochromatic X-ray beam 28 produced by the antimony secondary emitter 30. In FIG. 2B, wave form 66 represents the characteristic radiation from silver received by detector 44. Wave form 66 has a peak amplitude occurring at 22.5 keV wherein the amplitude of wave form 66 is directly proportional to the concentration of silver in the coating being monitored. The other wave forms designated as 68 and 70 represent characteristic radiation from other elements of lower atomic number than that of the selected element and wave form 72 represents the backscattered radiation from the first monochromatic X-ray beam 28.

Figure 2C:
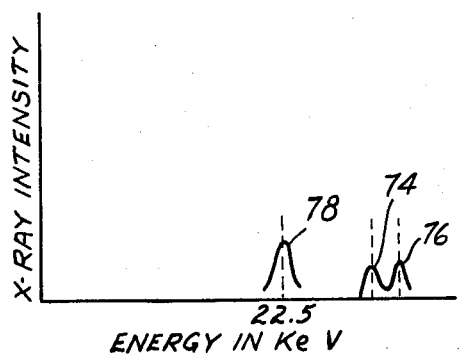

FIG. 2C is a plot of the X-ray intensity as a function of energy in keV of the radiation received by the second digital detector 64, from area 56, in response to the second monochromatic X-ray beam 48 produced by the silver emitter 50. Wave forms 74 and 76 represent the radiation from other elements of lower atomic number than the selected element and wave form 78 represents the backscattered radiation from the second monochromatic X-ray beam 48.

Thus, the wave forms 66, 68, 70 and 72 of FIG. 2B are representative of the first digital signal A after adjustment of the radiation to the detector 44; this adjustment will be explained hereinafter. The wave forms 74, 76 and 78 of FIG. 2C are representative of the second digital signal B after adjustment of the radiation to the detector 64; this adjustment will also be explained hereinafter. As will become apparent from additional description of the invention, the difference between signals A and B (A−B) will result in the indication of the concentration of silver in the target 12 which is represented by wave form 66 in FIG. 2B.

Continuing with reference to the indicating device 10 of FIG. 1, a monitoring means 80 includes a third secondary emitter 50 to receive a portion of the second beam 22, transmitted past the emitter 50 for producing a third monochromatic X-ray beam 84 to be received by a third digital detector 86 for producing a third digital signal C indicative of intensity fluctuations within the monochromatic X-ray beams caused by changes in the intensity and energy distribution of said polychromatic X-rays. The third detector 86 could be located in alternative locations 86′ or 86″ (to the exclusion of the third secondary emitter 82) to directly monitor the first or second monochromatic X-ray beams 28, 48, respectively. The third digital detector 86 can be a proportional counter or a scintillation counter, not necessarily identical to the first and second detectors 44, 64.

The detection circuitry of FIG. 1 applies the digital signals A, B and C to amplifier and discrimator circuits 88, 89 and 90, respectively. The amplifier and discrimator circuits 88, 89 and 90 are substantially identical wherein each circuit comprises known circuits to amplify the received electrical digital signals A, B and C and selectively apply the amplified electrical signals A, B and C exceeding the discrimator's set level to pulse shapers 91, 92 and 93, respectively. The selected level separates noise and lower energy radiation counts from higher energy radiation counts. The pulse shapers 91, 92 and 93 are substantially identical wherein each shaper produces a pulse of uniform amplitude and duration for each radiation quantum received by detectors 44, 64 and 86 that has an energy level which exceeds a predetermined level. The pulse duration is selected to be slightly less than the duration of an output pulse produced by detector 94, 64 or 86 in response to a radiation count such that at a maximum counting rate the pulse shapers 91, 92 and 93 produce a separate pulse for each quantum received. Pulses of uniform amplitude and duration are applied from the pulse shapers 91, 92 and 93 to different terminals of the differential ratio computer means 94.

The differential ratio computer means 94 receives the digital signals A, B and C and produces an output signal R which is the difference between the first and second digital signal divided by the third digital signal (A−B)/C to indicate the concentration of the selected element (Ag) within the target. Various differential ratio computer systems can be utilized for the purpose of integrating signals A, B and C. For instance, three counters having gates synchronized to open and close at the same time can be utilized so that the counters receive and count, for a predetermined time, signals A, B and C and produce BCD outputs indicative of counts A, B and C;

which BCD outputs are fed into an arithmetic unit which evaluates $R = (A-B)/C$ and produces the BCD output signal indicative of R. An alternate system would be to use a reversible counter whose gating time is controlled by the number of counts received by channel C. Thus, for the first C count the gate of the reversible counter opens so that input A minus input B is continuously monitored. The gate will remain open, monitoring the inputs of A and B, until a predetermined number of counts in channel C has been accumulated (e.g., $10^5$ counts) wherein the gate closes and a BCD output indicative of $R = (A-B)/C$ is produced. Recycling of the system permits consecutive measurements to be made.

The differential ratio computer means 94 is selected to produce an output signal R, $R = (A-B)/C$ evaluated in the form of a binary coded decimal (BCD), which output is applied to a compatible output device, for example a binary coded decimal-to-analog converter 96. Binary coded decimal-to-analog converter 96 converts the received binary coded decimal into an analog electrical signal which is fed directly into a strip chart recorder 98. The recording on the strip chart recorder 98 is a curve which varies linearly with the ratio of radiation counts produced by means 94. It is anticipated that the analog output signal of the converter and/or the output signal R of means 94 could also be used to directly control a process device which would be responsive to an electrical control signal, as for example, a coating apparatus for controlling the thickness of the coating on the base as a function of the analog signal from the converter 96.

The output signal R may also be applied to a digital read-out meter 100 for providing a continuous read-out of $(A-B)/C$ to an operator. Such a numerical readout provides an operator with a direct per cent deviation (e.g., 95 percent, 105 percent) of the selected element from the desired optimum, assuming the meter is set by adjustment of the third wedge 106 (as will be explained hereinafter) to read 1.000 for the optimum concentration of the selected element within the coating.

The device 10 of FIG. 1 also includes movable first, second and third wedges, 102, 104 and 106, respectively. The first movable wedge 102 is located between the polychromatic means 18 and the first secondary emitter 30 (movable in the directions as shown by arrow 103) for controlling the amount of the first polychromatic X-ray beam 20 received by the first secondary emitter 30 to control the intensity of the first monochromatic X-ray beam 28. The second movable wedge 104 located between the polychromatic means 18 and the second secondary emitter 50 (movable in the directions as shown by arrow 105) controls the amount of the second polychromatic X-ray beam 22 received by the second secondary emitter 50 to control the intensity of the second monochromatic X-ray beam 48. The third movable wedge 106 located between the third secondary emitter 82 and the third detector 86 (movable in the direction as shown by arrow 107) controls the amount of third monochromatic X-ray beam 84 received by the third detecting means 80.

During calibration of the device 10, the intensity of the backscattered radiation and other fluorescent radiation emitted by lower atomic number elements received by detector 44 is balanced against the backscattered radiation and other fluorescent radiation emitted by lower atomic number elements received by the detector 64. The radiation intensity level received by each detector 44 and 64 can be controlled by varying the thicknesses of each secondary emitter used for generating the monochromatic X-ray beams. Alternatively, the intensity of radiation can be controlled by controlling the intensity of the polychromatic beam impinging on each secondary emitter through the use of wedges 102 and 104 as described hereinbefore. Thus, in the absence of the selected element within the target, both detectors 44 and 64 will receive the same amount of radiation and the meter 100 will indicate a zero reading ($A-B=0$). With the selected element within the target, the first detector 44 will receive radiation in excess of the total radiation received by detector 64 which difference therebetween represents the radiation intensity due to the selected element. Radiation intensity due to the selected element for small concentration is directly proportional to the concentration of the selected element within the specific areas of the target.

The amount of radiation produced by a secondary emitter is generally much more than the amount of radiation that can be directly handled by a digital detector. Thus, the third movable wedge 106 located between the third secondary emitter 82 and the third detector 86 is to control the amount of radiation reaching the third detector 86 from the third secondary emitter 82 during calibration of the device 10.

Interposed between the first localized area 36 and the detector 44 is a first single passive filter 108. Simarily interposed between the second localized area 56 and the second detector 64 is a second single passive filter 110. Each filter 108, 110 is selected to have a predetermined thickness and an X-ray absorption edge wavelength slightly shorter than the characteristic wavelength of a fluorescent radiation emitted by the selected element. The predetermined thickness of each filter 108, 110 is selected such that each filter 108, 110 selectively transmits fluorescent radiation from a particularly elements and absorbs a known percent of the background and backscattered radiation to increase the ratio of signal strength to background noise.

Figure 3:
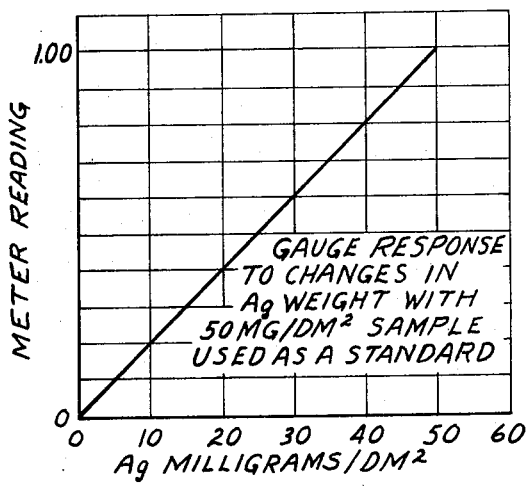
FIG. 3 is a graph representing a meter reading in response to changes in silver weight with 50 milligrams per decimeter squared sample used as a standard.

FIG. 3 is a graph which depicts the results of operation of one embodiment of an X-ray fluorescence gauge of the present invention for measuring the density of silver (Ag) in milligrams per decimeter square ($mg/dm^2$) coated on a polyester base. In obtaining FIG. 3, the device 10 was calibrated to read 1.00 on the meter 100 for a 50 $mg/dm^2$ Ag coating weight standard.

In operation, the device 10 is calibrated in the following manner. With a base material 16 (exclusive of the selected material under the device 10, the wedges 102 and 104 are adjusted until a zero reading is obtained on meter 100, at the output of the differential ratio computer where $R=(A-B)/C = 0$ and wherein $A=B$ for $C \neq \infty$. With a 50 $mg/dm^2$ silver standard under the device, the third wedge 106 is adjusted so that $R = (A-B)/C = 1.00$. Under these conditions, the meter 100 would read zero, for zero coating weigh of Ag, and 1.00 for 50 $mg/dm^2$ coating weight of Ag. Since the response of the device 10 for thin coatings is linear, a straight line joining points (0;0) to (1;50) yields the response of the device 10 in the region between 0–50 $mg/dm^2$, as shown by FIG. 3. After completion of the above described calibration, the graph of FIG. 3 was obtained by plotting differential ratio computer readings versus coating weight of Ag in $mg/dm^2$. These readings were also verified by chemical determination of the Ag coating weights. Due to the fact that the device 10 exhibits a linear response over the range of thin coatings and due to the fact that the meter 100 reads zero for zero coatings on a base, the device 10 can be easily calibrated to read directly in engineering units. For instance, instead of calibrating the meter 100 to read 1.00 for a 50 $mg/dm^2$ Ag standard, the gauge 100 could be calibrated, by adjusting the amount of radiation reaching detector 86 so that the meter 100 would read 50.00 for the standard 50 $mg/dm^2$ silver sample; thus the meter 100 would read directly in $mg/dm^2$.

Figure 4:
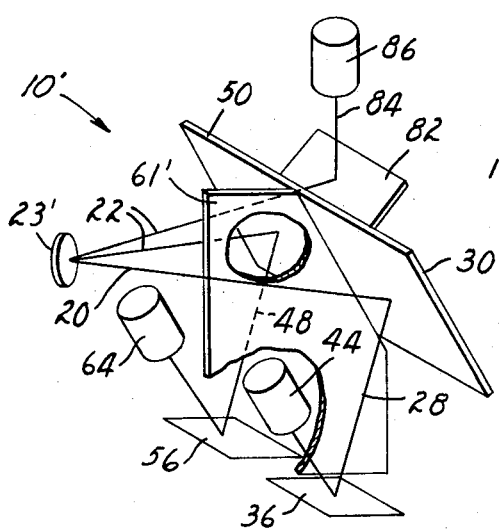
FIG. 4 is a diagrammatic representation of a second embodiment of the present invention illustrating a single window polychromatic X-ray tube.

The device 10' of the second embodiment illustrated in FIG. 4, which is the preferred embodiment and was not first discussed because it was believed that the first embodiment of FIG. 1 would be more clearly understood for teaching the concepts of the present invention, includes polychromatic means 18 having a single window 23' for transmitting the polychromatic X-rays. The shield means 61' divides the polychromatic X-rays in the first and second beams 20,22. A portion of the second beam 22 is transmitted through the emitter 50 to irradiate the third secondary emitter 82. The wedges, filters and electrical processing equipment of FIG. 1 are also components of the embodiment of FIG. 4 but have not been shown in the drawing nor discussed for sake of brevity. The second embodiment is preferred over the first embodiment because a single window X-ray tube generally is more efficient for obtaining the desired X-ray intensity and permits compactness of the device to minimize the separation between the localized areas 36,56 to increase the sampling area common to both monochromatic beams 28,48 on a moving web 17.

Figure 5:
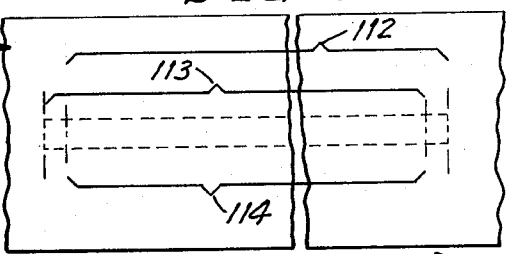
FIG. 5 illustrates overlapped sample areas when using the embodiment of FIG. 4 to indicate the concentration of the selected element within a moving web.

FIG. 5 illustrates the device 10' of FIG. 4 sampling from a web 17 moving in the direction of arrow 15. The first beam 28 will irradiate the web for a distance 112, the second beam 48 will irradiate the web for a distance 113 and both beams will have irradiated, separately, a common sampling area of the web for a distance 114. In a typical production installation with the web moving at 120 feet per minute and the device 10 activated to sample for a 10 second period, the distance 112 will be 240 inches and the distance 113 will be 240 inches. With a separation between the localized areas 36,56 of 2 inches, the distance 114 will be 238 inches. Thus, out of a total sampling distance of 242 inches, a sampling area of 238 inches, or 98 percent, will be common to the first and second beams 28,48.

While two embodiments have been described in detail, it is appreciated that this was for the purpose of illustration and that additional embodiments could be made without departing from the spirit and the scope of the invention as set forth in the appended claims.

What I claim is:

1. A device for indicating the concentration of a selected element within localized areas of a target, said device comprising:
   A. polychromatic means including an electron gun for generating polychromatic X-rays, and including divider means for dividing said polychromatic X-rays into first and second polychromatic X-ray beams;
   B. first monochromatic means receiving said first polychromatic X-ray beam for generating a first monochromatic X-ray beam having a wavelength which is slightly less than the absorption edge of the selected element and directing said monochromatic beam toward said target to afford excitation of the selected element and other elements of lower atomic number than the selected element;
   C. first detecting means for receiving fluorescent radiation emitted from said selected element and from said other elements for producing a first digital signal corresponding to the received radiation;
   D. second monochromatic means receiving said second polychromatic X-ray beam for generating a second monochromatic X-ray beam having a wavelength which is slightly greater than the absorption edge of said selected element and directing said second monochromatic beam toward said target to afford excitation of said other elements and avoid excitation of said selected element;
   E. second detecting means for receiving fluorescent radiation emitted from said other elements for producing a second digital signal corresponding to the received radiation;
   F. monitoring means to receive radiation caused by said polychromatic X-rays for producing a third digital signal indicative of fluctuations within said polychromatic X-rays; and
   G. differential ratio computer means electrically connected to said first and second detecting means and to said monitoring means for receiving said first, second, and third digital signals and for producing an output signal which is the difference between said first and second digital signals divided by said third digital signal to indicate the concentration of said selected element within said target independent of changes in the intensity and energy distribution of said polychromatic X-rays, independent of variations in other elements in the target, and independent of aberrations in the detectors and signal processing electronics.

2. A device for indicating the concentration of a selected element according to claim 1 wherein said device includes shield means for excluding the fluorescent radiation caused by said first monochromatic means from reaching said second detecting means and for excluding the fluorescent radiation caused by said second monochromatic means from reaching said first detecting means.

3. A device for indicating the concentration of a selected element within a target according to claim 2 wherein said monitoring means receives a portion of said first monochromatic beam for producing said third digital signal indicative of intensity fluctuations of said first monochromatic X-ray beam caused by intensity fluctuations and energy distribution changes within said polychromatic X-rays.

4. A device for indicating the concentration of a selected element within a target according to claim 2 wherein said monitoring means receives a portion of said second monochromatic beam for producing said third digital signal indicative of intensity fluctuations of said second monochromatic X-ray beam caused by intensity fluctuations and energy distribution changes within said polychromatic X-rays.

5. A device for indicating the concentration of a selected element within a target according to claim 2 wherein
   A. said first monochromatic means includes a first secondary emitter receiving said first polychromatic X-ray beam for generating said first monochromatic X-ray beam; and wherein
   B. said second monochromatic means includes a second secondary emitter receiving a first portion of said second polychromatic X-ray beam for generating said second monochromatic X-ray beam.

6. A device for indicating the concentration of a selected element within a target according to claim 5 wherein said monitoring means includes
   A. a third secondary emitter to receive a second portion of said second polychromatic X-ray beam to produce a third monochromatic X-ray beam; and
   B. third detecting means receiving said third monochromatic X-ray beam for producing said third digital signal.

7. A device for indicating the concentration of a selected element within a target according to claim 6 wherein said device includes
   A. a first movable wedge located between said polychromatic means and said first secondary emitter for controlling the amount of said first polychromatic X-ray beam received by said first secondary emitter;
   B. a second movable wedge located between said polychromatic means and said second secondary emitter for controlling the amount of said second polychromatic X-ray beam received by said second secondary emitter; and
   C. a third movable wedge located between said third secondary emitter and said third detecting means for controlling the amount of said third monochromatic X-ray beam received by said third detecting means wherein by adjustment of said first, second and third movable wedges said first, second and third digital signals respectively can be controlled to calibrate said device.

8. A device for indicating the concentration of a selected element within a target according to claim 1 wherein a continuously moving web provides the target and said device includes
   A. first collimating means for directing said first monochromatic beam to irradiate a first localized area on the target; and
   B. second collimating means for directing said second monochromatic beam to irradiate a second localized area that is adjacent to said first localized area and wherein said first and second localized areas are aligned in the direction of movement of the target whereby the device will provide sampling from substantially identical areas of the target.

9. A method for indicating the concentration of a selected element within a target, said method comprising the steps of:
   A. generating polychromatic X-rays and dividing said polychromatic X-rays into first and second polychromatic X-ray beams;

B. receiving said first polychromatic X-ray beam to generate a first monochromatic X-ray beam having a wavelength which is slightly less than the absorption edge of the selected element to afford excitation of the selected element and excitation of other elements of lower atomic number than the selected element;

C. directing said first monochromatic beam to irradiate a first localized area on the target;

D. sensing fluorescent characteristic radiation emitted from said selected element and from said other elements within said first area and producing a first digital signal corresponding to the sensed radiation;

E. receiving said second polychromatic X-ray beam to generate a second monochromatic X-ray beam having a wavelength which is slightly greater than the absorption edge of said selected element to afford excitation of said other elements and avoid excitation of said selected element;

F. directing said second monochromatic beam to irradiate a second localized area on said target;

G. sensing fluorescent characteristic radiation emitted from said other elements within said second area and producing a second digital signal corresponding to the sensed radiation;

H. monitoring the radiation caused by said polychromatic X-rays and producing a third digital signal indicative of fluctuations of said polychromatic X-rays; and I. combining said first, second, and third digital signals to produce an output signal which is the difference between said first and second digital signals divided by said third digital signal to indicate the concentration of said selected element independent of changes in the intensity and energy distribution of said polychromatic X-ray beam, independent of variations in the amount of other elements in the target, independent of any electrical signal gains caused by the detectors and signal processing electronics.

10. A method for indicating the concentration of a selected element within a target according to claim 9 wherein step (H) includes monitoring a portion of said first monochromatic beam to produce said third digital signal indicative of intensity fluctuations of said within said monochromatic beam caused by intensity fluctuations and energy distribution changes said polychromatic X-rays.

11. A method for indicating the concentration of a selected element within a target according to claim 9, wherein step (H) includes
  receiving a portion of one of said polychromatic X-ray beams to produce a third monochromatic X-ray beam; and
  monitoring said third monochromatic X-ray beam to produce said third digital signal.

12. A method for indicating the concentration of a selected element within a target according to claim 11 wherein said method includes
  A. intercepting a portion of said first polychromatic X-ray beam in order to control the intensity of said first monochromatic X-ray beam;
  B. intercepting a portion of said second polychromatic X-ray beam for controlling the intensity of said second monochromatic X-ray beam; and
  C. intercepting a portion of said third monochromatic beam for controlling the intensity of said third monochromatic beam used for producing said third digital signal wherein said first, second and third digital signals can be controlled to calibrate the device.

13. A method for indicating the concentration of a selected element within a coating on a web moving rapidly along a path, said method comprising the steps of:

A. generating polychromatic X-rays and dividing said polychromatic X-rays into first and second polychromatic X-ray beams;

B. receiving said first polychromatic X-ray beam to generate a first monochromatic X-ray beam having a wavelength which is slightly less than the absorption edge of the selected element to afford excitation of the selected element and excitation of other elements of lower atomic number than the selected element;

C. directing said first monochromatic beam toward the path to irradiate a first localized area on the coating moving along said path;

D. sensing fluorescent characteristic radiation emitted from said selected element and from said other elements within said first area and producing a first digital signal corresponding to the sensed radiation;

E. simultaneously receiving said second polychromatic X-ray beam to generate a second monochromatic X-ray beam having a wavelength which is slightly greater than the absorption edge of said selected element to afford excitation of said other elements and avoid excitation of said selected element;

F. directing said second monochromatic beam toward the path to irradiate a second localized area that is adjacent to and aligned with said first localized area in the direction of movement of the coating whereby substantially the same areas of the coating will be irradiated by said first and second monochromatic beams;

G. sensing fluorescent characteristic radiation emitted from said other elements within said second area and producing a second digital signal corresponding to the sensed radiation;

H. monitoring the radiation caused by said polychromatic X-rays and producing a third digital signal indicative of intensity fluctuations of said monochromatic X-ray beams; and I. combining said first, second, and third digital signals to produce an output signal which is the difference between said first and second digital signals divided by said third digital signal to indicate the concentration of said selected element independent of changes in the intensity and energy distribution of said polychromatic X-ray beam, independent of variations in the amount of other elements in the coating, independent of any electrical signal gains caused by the detectors and signal processing electronics.

* * * * *

UNITED STATES PATENT OFFICE
CERTIFICATE OF CORRECTION

Patent No. 3,671,744  Dated June 20, 1972

Inventor(s) Nikiforos Constantine

It is certified that error appears in the above-identified patent and that said Letters Patent are hereby corrected as shown below:

In the Specification:

Column 3, delete lines 65 through 76, beginning with "the" and ending with "beam;".

Column 4, line 18, after "reaching" insert -- the first detector depicting the fluorescent characteristic radiation emitted by the selected element, fluorescent characteristic radiation emitted from other lower atomic number elements and backscattered radiation in response to the target being irradiated by the first monochromatic X-ray beam;

Fig. 2C is a graph illustrating a radiation spectrum reaching the second detector depicting fluorescent characteristic radiation emitted from other lower atomic number elements (exclusive of radiation from the selected element) and backscattered radiation produced in response to the target being irradiated by the second monochromatic x-ray beam; --

In the Claims:

Column 11, line 42, delete "within said" and insert in lieu thereof -- first --;

line 43, after "changes" insert -- within --.

Signed and sealed this 9th day of July 1974.

(SEAL)
Attest:

McCOY M. GIBSON, JR.
Attesting Officer

C. MARSHALL DANN
Commissioner of Patents